(12) United States Patent
Kook et al.

(10) Patent No.: US 10,247,600 B2
(45) Date of Patent: Apr. 2, 2019

(54) MODE-MATCHING OF MEMS RESONATORS

(71) Applicant: Analog Devices, Inc., Norwood, MA (US)

(72) Inventors: Youn-Jae Kook, Winchester, MA (US); Jose Barreiro Silva, Bedford, MA (US); Jianrong Chen, Andover, MA (US); Ronald A. Kapusta, Jr., Carlisle, MA (US)

(73) Assignee: Analog Devices, Inc., Norwood, MA (US)

( * ) Notice: Subject to any disclaimer, the term of this patent is extended or adjusted under 35 U.S.C. 154(b) by 187 days.

(21) Appl. No.: 15/348,521

(22) Filed: Nov. 10, 2016

(65) Prior Publication Data

US 2018/0128674 A1    May 10, 2018

(51) Int. Cl.
*G01C 19/5776* (2012.01)
*G01C 19/5726* (2012.01)
*G01H 13/00* (2006.01)
*G01P 15/00* (2006.01)
*G01P 21/00* (2006.01)

(52) U.S. Cl.
CPC ......... *G01H 13/00* (2013.01); *G01C 19/5726* (2013.01); *G01C 19/5776* (2013.01); *G01P 15/00* (2013.01); *G01P 21/00* (2013.01)

(58) Field of Classification Search
CPC .............. G01H 13/00; G01C 19/5776; G01C 19/5726; G01P 15/00; G01P 21/00
USPC ......................................................... 73/579
See application file for complete search history.

(56) References Cited

U.S. PATENT DOCUMENTS

| 8,151,641 B2 | 4/2012 | Geen |
| 8,665,031 B2 | 3/2014 | Gilbert |
| 8,677,821 B2 | 3/2014 | Ayazi et al. |
| 2010/0294039 A1* | 11/2010 | Geen .................. G01C 19/5776 73/504.12 |
| 2011/0041609 A1 | 2/2011 | Clark et al. |
| 2013/0197858 A1 | 8/2013 | Egretzberger et al. |
| 2014/0000365 A1* | 1/2014 | Aaltonen ........... G01C 19/5776 73/504.12 |

(Continued)

OTHER PUBLICATIONS

Ezekwe et al., A Mode-Matching EΔ Closed-Loop Vibratory Gyroscope Readout Interface With a 0.004°/s/√Hz Noise Floor Over a 50 Hz Band. IEEE J Solid-State Circ. Dec. 2008;43(12):3039-48.

(Continued)

*Primary Examiner* — J M Saint Surin
(74) *Attorney, Agent, or Firm* — Wolf, Greenfield & Sacks, P.C.

(57) ABSTRACT

Systems and techniques are described for matching the resonance frequencies of multiple resonators. In some embodiments, a resonator generates an output signal reflecting the resonator's response to an input drive signal and an input noise signal. The output signal is then compared to the noise signal to derive a signal representative of the resonance frequency of the resonator. Comparing that signal to the output signal of a second resonator gives an indication of whether there is a difference between the resonance frequencies of the two resonators. If there is, one or both of the resonators may be adjusted. In this manner, the resonance frequencies of resonators may be matched during normal operation of the resonators.

20 Claims, 10 Drawing Sheets

(56) References Cited

U.S. PATENT DOCUMENTS

2014/0000366 A1\* 1/2014 Blomqvist ............ G01C 19/56
                                                          73/504.12

OTHER PUBLICATIONS

Witteman, Detection and Signal Processing: Technical Realization. Springer Berlin Heidelberg. 2006;95-106, 119-20.

\* cited by examiner

MODE-MATCHING OF MEMS RESONATORS

FIELD OF THE DISCLOSURE

The present application relates to assessing and matching the resonance frequencies of resonators.

BACKGROUND

Some microelectromechanical systems (MEMS) devices include two or more MEMS resonators. Resonators receive an input electrical signal and output an electrical signal, the magnitude of which depends on the frequency of the input signal. The magnitude of the output signal is greatest when the frequency of the input signal matches the so-called "resonance frequency" of the resonator. For MEMS resonators, the resonance frequency depends on factors such as the size and shape of the resonator, at least some of which can deviate from a target based on imperfections in the process of manufacturing the MEMS resonator. Thus, the resonance frequencies of two or more MEMS resonators in a MEMS device may differ from each other even when designed to be the same.

THE SUMMARY OF THE DISCLOSURE

Systems and techniques are described for matching the resonance frequencies of multiple resonators. A resonator generates an output signal reflecting the resonator's response to an input drive signal. By adding a known noise signal to the input drive signal and comparing the resonator output signal to the noise signal, a signal representative of the resonance frequency of the resonator may be derived. Comparing that signal to the output signal of a second resonator gives an indication of whether there is a difference between the resonance frequencies of the two resonators. If there is, one or both of the resonators may be adjusted. In this manner, the resonance frequencies of resonators may be matched during normal operation of the resonators.

According to some embodiments, a method for operating a device having a first mechanical resonator with a first resonance frequency and a second mechanical resonator with a second resonance frequency is provided, comprising generating an impulse response of a transfer function of the first mechanical resonator by driving a noise signal to the first mechanical resonator and cross-correlating the noise signal with a signal representing or derived from an output signal of the first mechanical resonator. The method further comprises determining a difference between the first resonance frequency of the first mechanical resonator and the second resonance frequency of the second mechanical resonator using the impulse response of the transfer function of the first mechanical resonator.

According to some embodiments, a microelectromechanical systems (MEMS) apparatus is provided, comprising a first mechanical resonator with a first resonance frequency, a second mechanical resonator with a second resonance frequency, a noise source configured to drive a noise signal to the first mechanical resonator, and a cross-correlator configured to generate an impulse response of a transfer function of the first mechanical resonator by cross-correlating the noise signal with a signal representing or derived from an output signal of the first mechanical resonator. The MEMS apparatus further comprises processing circuitry configured to determine a difference between the first resonance frequency of the first mechanical resonator and the second resonance frequency of the second mechanical resonator using the impulse response of the transfer function of the first mechanical resonator.

According to some embodiments, a microelectromechanical systems (MEMS) apparatus, comprising a first mechanical resonator with a first resonance frequency, a second mechanical resonator with a second resonance frequency, and means for determining a difference between the first resonance frequency and the second resonance frequency.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear. In the drawings.

DETAILED DESCRIPTION

Aspects of the present application allow for matching of the resonance frequencies of two or more resonators during operation, and thus after manufacture of the resonators. An apparatus and method are provided to determine (e.g., measure) the difference between resonance frequencies of two resonators and adjust the resonance frequency of one or both of the resonators until the difference is substantially zero. The adjustment may be iterative. The resonance frequencies of the two resonators may be unknown, for example due to manufacturing errors which cause the resonance frequencies to deviate from target manufactured values. To get an indication of the resonance frequency of one of the resonators during operation, the desired input signal used to drive the resonator is combined with an applied noise signal and input to the resonator. This may be done without stopping the input of the desired input signal to the resonator. The output of the resonator then represents a combination of the resonator's response to the desired input signal and the applied noise signal.

The output signal of the resonator may then be compared to the noise signal itself, for example by performing cross-correlation of the two signals. The result of this comparison may be referred to as an "impulse response" of the transfer function of the resonator, and may be indicative of the resonance frequency of the resonator. For example, the phase of the transfer function will, in at least some scenarios, be zero for the resonance frequency of the resonator. Therefore, comparing the phase of the transfer function with a phase of a target signal, such as the output signal of a second resonator, gives an indication of whether the frequency of the transfer function is the same as the frequency of the target signal. Using the output signal of a second resonator as the target signal provides an indication of how the frequencies of the first and second resonators compare to each other. When there is no phase difference between the transfer function derived from the first resonator and the output signal of the second resonator, then the resonance frequencies of the first and second resonators match. If there is a phase difference, then one of the resonators may be tuned until the phase difference is reduced or eliminated entirely. In this manner, the resonance frequencies of two resonators may be matched. Alternatively, one or both of the resonators may be tuned to provide a desired separately between the resonance frequencies, to provide split mode operation.

Using a noise signal that is a stochastic signal, or an approximation of a stochastic signal, in the method described above may be beneficial. For example, use of such a noise signal may avoid introducing into the output signal of the first resonator undesirable signal characteristics, such as side bands or spurious modes, at least in the frequency range of interest. Thus, the noise signal can be easily removed from the output signal of the first resonator, and thus does not impact the desired operation of that resonator. Therefore, normal operation of the resonator between its input and output is not directly affected during mode-matching, allowing mode-matching or attainment of a desired split mode of operation to be performed in the background of the normal device operation. Also, when a stochastic signal is used, the noise response in the output signal of the first resonator represents the resonator's response across a broad range of spectral components that may be used to derive the resonance spectrum and accordingly the resonance frequency of the resonator, without the need for a dedicated single-frequency or multiple-frequency test signal to probe the resonator's spectral response. Thus, the method may be performed efficiently and without complex frequency generator circuitry to generate the noise signal.

Non-limiting examples of suitable types of noise signals includes white noise and pink noise. In practice, generating a stochastic signal is difficult, and thus an approximation of a stochastic signal may be provided, such as a pseudorandom signal. In some embodiments, a pseudorandom signal generated by a linear shift register may be used as the noise signal. The noise signal has known characteristics in at least some embodiments, and as will be appreciated from the following discussion is intentionally injected to the circuit.

Figure 1:
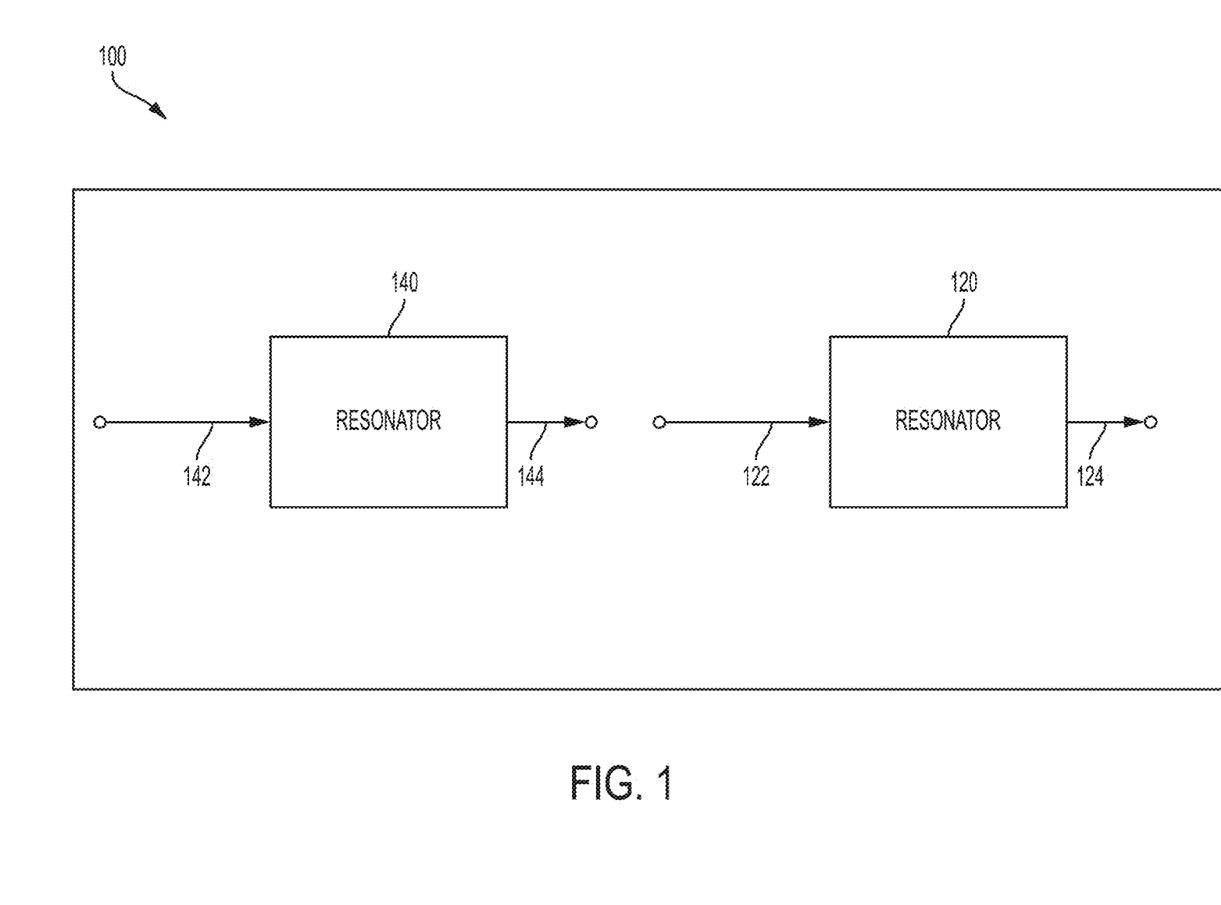
FIG. 1 is a block diagram showing a microelectromechanical systems (MEMS) device including two resonators, according to a non-limiting embodiment.

FIG. 1 illustrates a MEMS device 100 including two resonators 120 and 140, with inputs 122 and 142, respectively, and outputs 124 and 144, respectively. The amplitude and phase of the output signals from each of the resonators will exhibit resonance behavior when the frequency of the input signal to that resonator is at a resonance frequency of the resonator.

In some embodiments in which a MEMS sensor device includes multiple resonators, it may be desirable for the resonance frequencies of the resonators to be substantially the same. When the resonance frequencies are the same, the resonators are said to be "mode-matched." As an example, two resonance frequencies may be considered substantially matched if they differ by no more than ten times $\omega_o/Q$, no more than five times $\omega_o/Q$, no more than twice $\omega_o/Q$, or any value within those ranges. Q is the quality factor and $\omega_0$ is the resonance frequency of the resonator, as will be described further below.

Figure 2A:
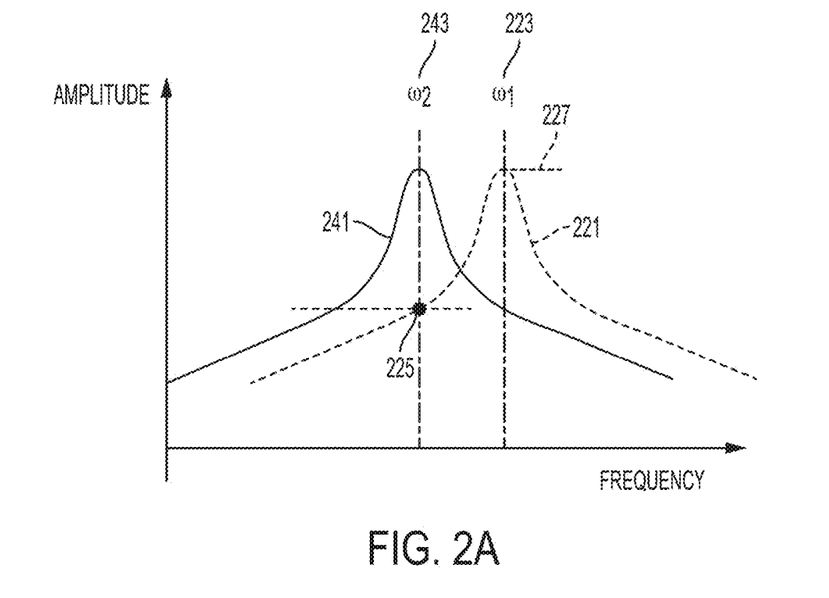
FIGS. 2A and 2B illustrate schematic data plots of resonator amplitude and phase transfer functions, respectively, according to some embodiments.
Figure 2B:
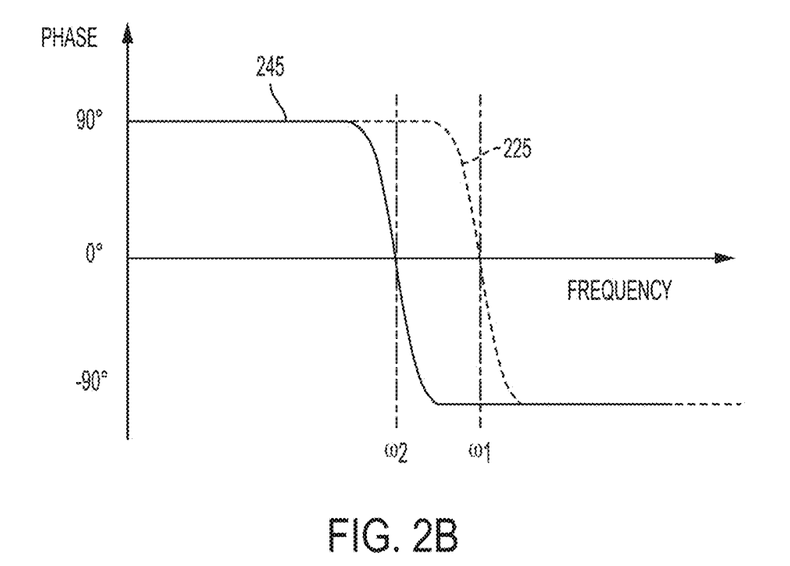

FIG. 2 shows exemplary behavior of two mode-mismatched resonators. In FIG. 2, two exemplary resonance response curves 221 and 241 are plotted for the resonators 120 and 140 in device 100 in FIG. 1. In the example in FIG. 2, curve 221 shows the amplitude of output signal at output 124 versus the frequency of the input signal at the resonator input 122. The resonance response curve 221 shows a resonance peak at a resonance frequency $\omega_1$ 223 where the output signal amplitude in the first resonator 120 is at a maximum. Similarly, resonance response curve 241 shows a resonance peak at a resonance frequency $\omega_2$ 243 where the output signal amplitude in the second resonator 140 is at a maximum. In some embodiments, each of resonators 120 and 140 is a MEMS resonator and the shape of each of the resonance response curves 221 and 241 may be characterized by a transfer function H(s):

$$H(s) = \frac{\omega_0 s}{s^2 + \frac{\omega_0}{Q}s + \omega_0^2} \qquad \text{Eq. (1)}$$

where s is the input signal frequency, Q is the quality factor and $\omega_0$ is the resonance frequency of the resonator.

There are various reasons why it is desirable in at least some applications for the resonance frequencies of two resonators of a device, such as MEMS device 100, to be mode-matched. For example, in MEMS sensor applications, the sensor signals at the input and output of MEMS resonators are typically subject to noise from environment factors as well as interference. To increase the signal to noise ratio (SNR), it is desirable to maximize the signal amplitude at the output of a resonator by mode-matching the resonator resonance with the frequency of the input signal. Referring back to the exemplary resonance curves in FIG. 2, in some embodiments when the resonator 120 is coupled to and driven by the output of resonator 140 at its resonance frequency $\omega_2$, the output amplitude 225 of resonator 120 is lower than a peak amplitude 227 when the resonance frequency $\omega_1$ of resonator 120 is mismatched with $\omega_2$. It is desirable to mode match the two resonator frequencies by selectively tuning one or both of the resonant frequencies until $\omega_1=\omega_2$ to achieve a larger amplitude in resonator 120 and a higher signal to noise ratio. In some embodiments, changes in environmental conditions such as, but not limited to, temperature and humidity may cause temporal shift of resonance frequency of mechanical resonators. In such scenarios, it is desirable to provide a manner by which to continuously monitor a resonator's resonance frequency and tune the resonance frequency to match a reference mode frequency, to maintain a high signal to noise ratio in the output signals.

In some embodiments, MEMS device 100 is a MEMS gyroscopic sensor, resonator 140 is a primary mechanical resonator while resonator 120 is a secondary mechanical resonator or accelerometer (also referred to herein as an "accelerator"). It will be appreciated that the primary and secondary resonators may be reversed, and that resonator 140 is described as the primary resonator and resonator 120 as the secondary for resonator for purposes of explanation. The primary resonator 140 is driven at a resonance frequency, $\omega_2$, which can be used for reference clock generation. The secondary resonator 120 is driven by the primary resonator, and amplitude of the secondary resonator is proportional to velocity of the primary resonator and a rotation signal, which is called the Coriolis Effect, such that $Y \propto (\dot{X} \times \Omega)$, where Y is displacement of the secondary resonator, $\dot{X}$ is velocity of the primary resonator and $\Omega$ is rotation signal. Therefore, the output signal amplitude of the secondary resonator may represent the rotational characteristics of the MEMS sensor device. Mode-matching the accelerator with the primary resonator may provide higher output signal amplitude representing the rotational acceleration rate sensed by the MEMS sensor and better signal to noise ratio.

Although it is desirable in some scenarios to mode match the resonators, it may be desirable in other scenarios to maintain a split mode between the resonators, meaning that the resonance frequencies of the resonators are maintained at a desired difference from each other. The aspects of the disclosure described herein for determining a difference in resonance frequency between two mechanical resonators may be used to maintain the resonance frequencies at a desired difference.

Figure 3A:
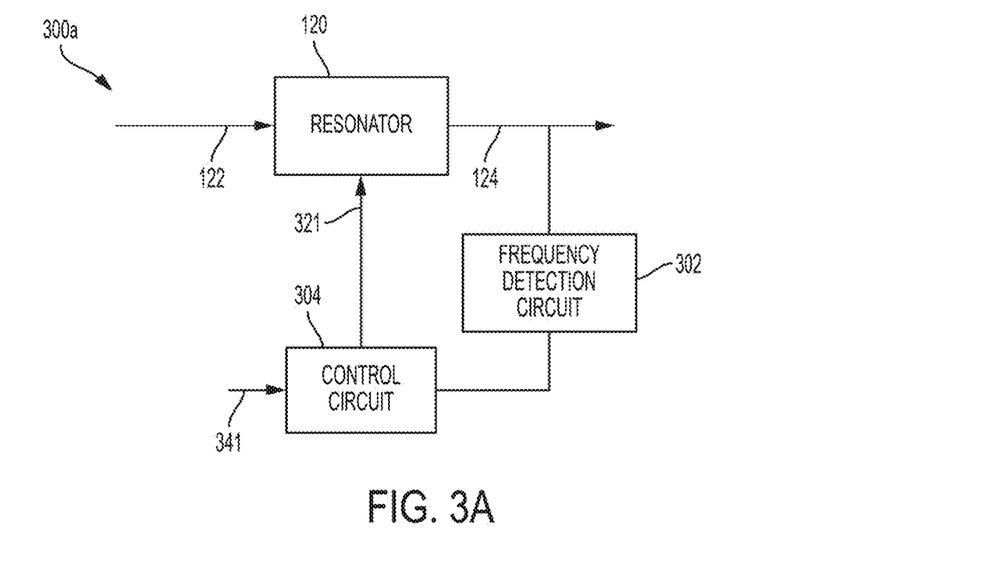
FIGS. 3A and 3B are block diagrams showing exemplary components of an apparatus for mode-matching resonator frequencies, according to some embodiments.

FIG. 3A shows an apparatus 300a comprising a resonator 120 configured to receive an input signal at input 122 and provide an output signal at output 124. A resonance frequency detection circuit 302 measures the resonance frequency of resonator 120 at output 124. A control circuit 304 is coupled to an output of the resonance frequency detection circuit 302 to compare the measured resonance frequency with a signal with reference frequency 341 to determine the amount of mode-mismatch. Control circuit 304 is further configured to provide a control signal at a control input 321 of resonator 120 according to the amount of mode-mismatch. The signal with reference frequency 341 may be provided from an output of a second resonator (not shown) with a known resonance frequency. Resonance frequency detection circuit 302, control circuit 304 and resonator 120 are connected in a feedback loop that iteratively adjusts the resonance frequency of resonator 120 until it matches a desired value. In some embodiments, the desired value for the resonance frequency of resonator 120 may be substantially equal the reference frequency within a desired accuracy. In other embodiments, the desired value for the resonance frequency of resonator 120 may be a desired offset from the reference frequency.

In some embodiments, apparatus 300a is a MEMS gyroscopic sensor and resonator 120 is the secondary resonator or accelerator being driven at a resonance frequency of a primary resonator at the input 122 during normal sensing operation. The inventors have recognized that to characterize the resonance frequency of the resonator 120, one technique is to interrupt normal operation of the apparatus 300a, supply a test frequency sweep signal at input 122 to resonator 120 and record at the output 124 the amplitude response versus sweeping test signal frequency similar in some aspect to the resonance response curve 221 in FIG. 2, where the value of the frequency peak represents the resonance frequency. In this technique, the MEMS sensor device operation is interrupted for the duration of the resonance frequency measurement. In some embodiments, it is desirable to provide a system and technique to measure and mode-match resonator frequencies in a background mode, without interruption of normal operation at the input and output of a resonator.

Figure 3B:
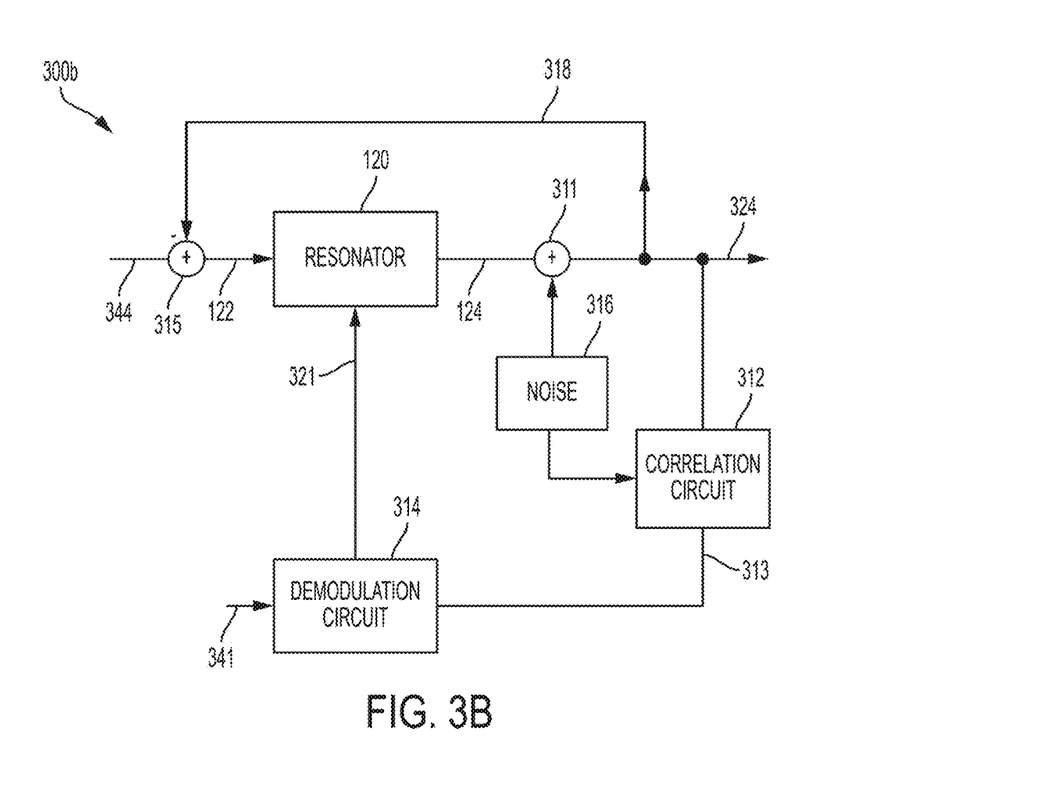

FIG. 3B shows another exemplary apparatus 300b configured to mode-match the resonance frequency of a resonator 120 to a reference frequency in the background operation of the device. Apparatus 300b is similar, in some respects, to the apparatus 300a in FIG. 3A and like components are shown in FIG. 3B with the same reference number as in FIG. 3A.

In FIG. 3B, the resonance frequency measurement circuit is implemented by injecting a noise signal from a noise generator 316 to output 124 with an adder 311, and using a correlation circuit 312 to perform a cross-correlation between the noise-added output signal 324 and the noise signal from noise generator 316.

Figure 9A:
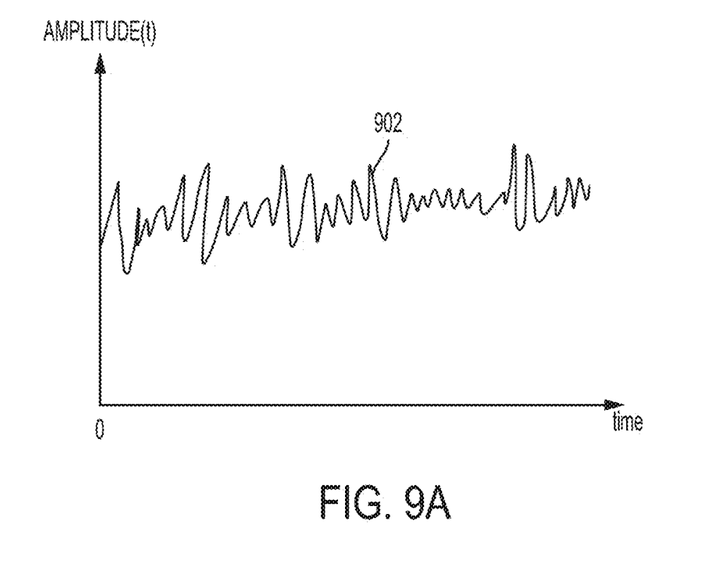
FIGS. 9A and 9B are schematic data plots showing exemplary forms of noise signals in the time domain and frequency domain, respectively, as may be implemented according to methods for mode-matching resonator frequencies, as described herein.
Figure 9B:
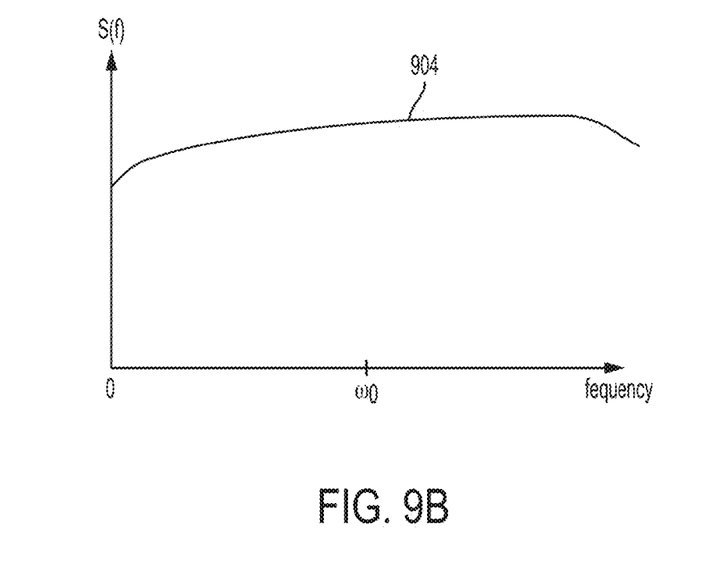

The noise signal from noise generator 316 may be any stochastic or approximately stochastic signal, an example of which is shown in the amplitude versus time plot 902 in FIG. 9A. An example power spectral distribution S(f) for a noise signal 904 is shown in FIG. 9B. In some embodiments, the frequency range of interest of the noise signal covers the expected value of one or more resonance frequencies of resonators in a MEMS sensor device. In some embodiments, noise signal 316 may be a shaped noise with a continuous power spectrum of any suitable shape versus frequency. As non-limiting examples, the noise signal from noise generator 316 may be frequency shaped-shaped, such that its power spectral density is formed by a filter (e.g., a high pass filter). In some embodiments, the noise signal is white or pink noise.

The benefit of using a noise signal of the types described above is that it adds no side band or discrete tone to the output signal 124 and thus does not adversely affect the signal characteristics at the output of the resonator. In some embodiments, there is no need to interrupt a resonator driving signal 122 in the apparatus 300b to perform resonance frequency measurements and mode-matching. Thus, in some embodiments, the noise signal may be driven to the mechanical resonator even while the output signal of the mechanical resonator is being processed to assess a characteristic sensed by the apparatus, such as acceleration, velocity, or rotation.

Apparatus 300b includes a first feedback loop 318 between the output signal 324 and input 122 of the resonator 120 to feed at least a portion of the output signal 324 back at the input 122 of resonator 120. An adder 315 combines the feedback signal from feedback loop 318 with an input signal 344 before outputting the combination at the input 122 of resonator 120. The first feedback loop 318 may be regarded as a resonator feedback loop. Since noise-added output signal 324 contains a signal component based on the injected noise signal from noise generator 316, the feedback loop 318 serves to inject at least a portion of noise signal from noise generator 316 into the input 122 of the resonator. Due to the linearity of the resonator transfer function, at output 124 of the resonator, the output signal is a combination of response to input signal 344 as well as response to the noise signal from noise generator 316. Therefore the output 124 and output signal 324 contains a noise response component from the resonator 120.

To characterize the resonance frequency of resonator 120, a correlation circuit 312 performs a cross-correlation between the noise-added output signal 324 and the noise signal from noise generator 316. Because output signal 324 contains a noise response to the noise signal of noise generator 316, the cross-correlated signal 313 is an impulse response signal. In this method, a broad range of spectral response may be probed without sweeping individual frequencies at the input of the resonator 120 to measure a spectral response curve.

Impulse response 313 is compared with a signal 341 using a reference frequency at a demodulation circuit 314. The output of the demodulation circuit represents the amount of mode-mismatch between the resonance frequency of resonator 120 and the reference frequency. In some embodiments, the reference frequency is from a second resonator. In a non-limiting example, the reference frequency is the resonance frequency from a primary resonator in a MEMS gyroscopic sensor.

The demodulation circuit 314 provides a control signal at control input 321 of resonator 120 according to the amount of mode-mismatch. Resonator 120, correlation circuit 312 and demodulation circuit 314 form a second feedback loop that iteratively adjusts the resonance frequency of resonator 120 until it matches the reference frequency in signal 341. The second feedback loop may sometimes be regarded as a matching feedback loop.

Figure 3C:
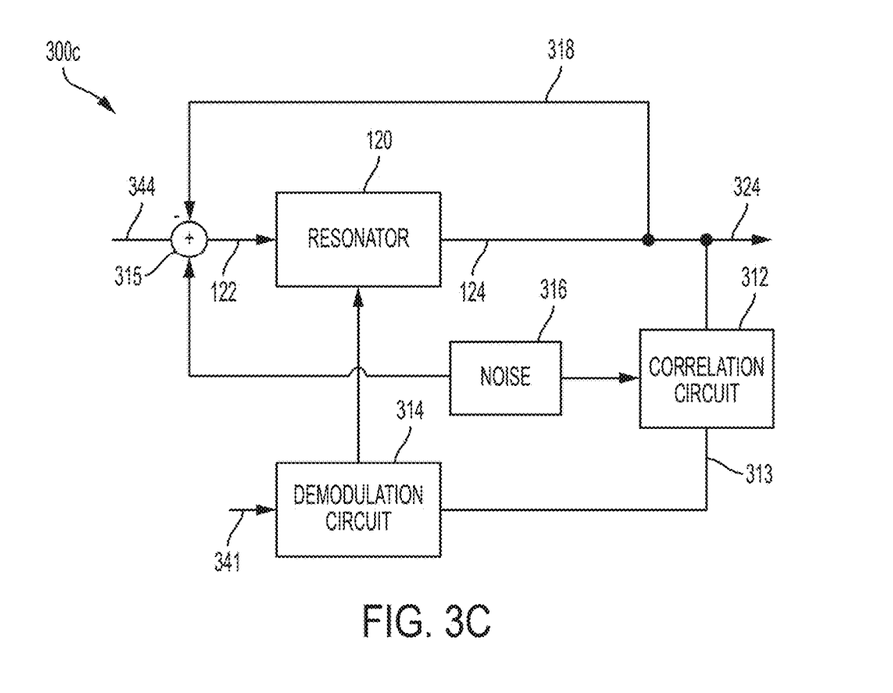
FIGS. 3C and 3D are block diagrams showing exemplary components of an apparatus for mode-matching resonator frequencies, according to some embodiments.

FIG. 3C shows another exemplary apparatus 300c configured to provide for determination and, optionally, control of the resonance frequency of a resonator 120 relative to a reference frequency in the background operation of the device. Apparatus 300c is similar, in some respects, to the apparatus 300b in FIG. 3B and like components are shown in FIG. 3C with the same reference number as in FIG. 3B. Apparatus 300c differs from apparatus 300b in that instead of injecting a noise signal from noise generator 316 to the output 124 of resonator 120 via adder 311 as shown in FIG. 3B, in apparatus 300c a noise signal from noise generator 316 is injected at the input 122 to resonator 120 by combining the noise signal with the input signal 344 using an adder 315. In this fashion, the output 324 of apparatus 300c contains a component responsive to the noise signal injected at input to the resonator and a cross-correlation between the noise-added output signal 324 and the noise signal from noise generator 316 leads to cross-correlated signal 313 that represents an impulse response of a signal transfer function of resonator 120.

Figure 3D:
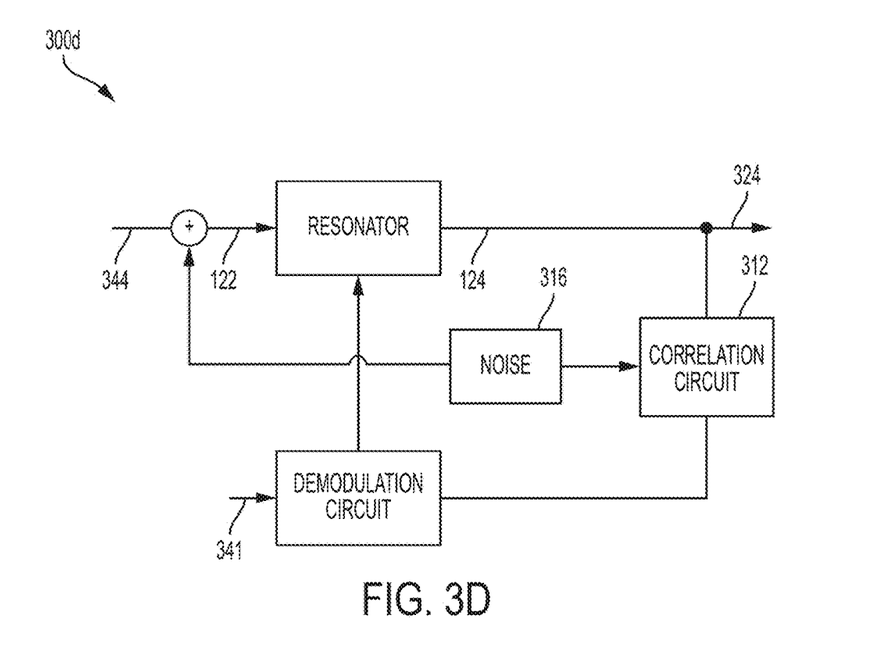

FIG. 3D shows another exemplary apparatus 300d configured to provide for determination and, optionally, control of the resonance frequency of a resonator 120 relative to a reference frequency in the background operation of the device. Apparatus 300d is similar, in some respects, to the apparatus 300c in FIG. 3C and like components are shown in FIG. 3D with the same reference number as in FIG. 3C. Apparatus 300d differs from apparatus 300c in that apparatus 300d has no resonator feedback loop 318, which may simply the design and implementation of the apparatus.

Figure 4:
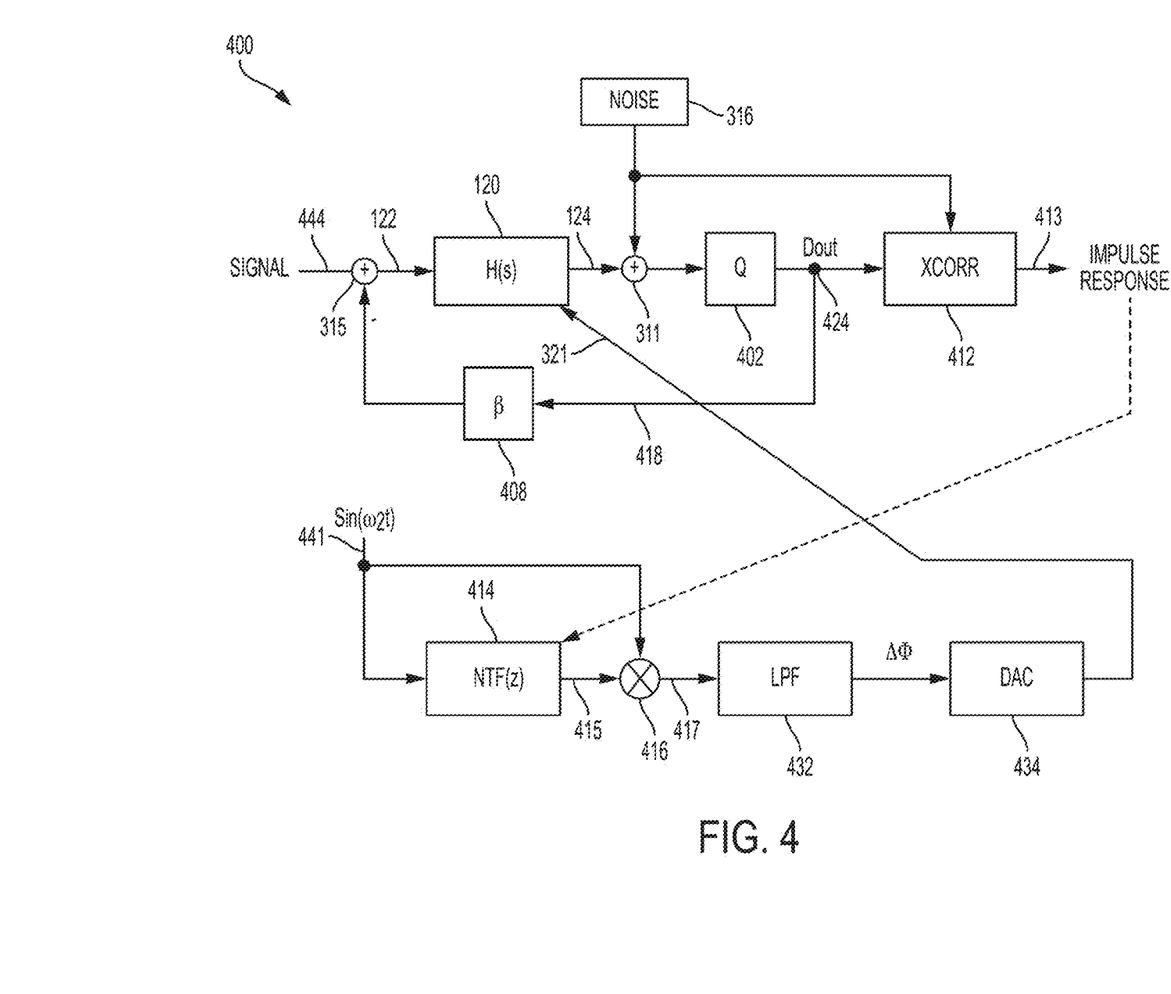
FIG. 4 is a block diagram showing exemplary components of an apparatus for mode-matching resonator frequencies, according a non-limiting embodiment.

According to some aspects of the present application, apparatus 400 of FIG. 4 is another exemplary implementation of apparatus 300b discussed above in relation to FIG. 3B. In FIG. 4, a noise signal from noise generator 316 is injected into output 124 at an adder 311. A quantizer 402 digitizes the analog output signal of the adder 311 into digital output signal $D_{out}$ 424. Apparatus 400 includes a first feedback loop 418 between the digitized output 424 and input 122 of the resonator 120 to feed at least a portion of the output 424 back at the input 122 of resonator 120. Because output signal 424 is a digitized signal, the feedback loop 418 may additionally include a digital-to-analog converter (DAC) 408 to convert the digitized signal back into analog form. Adder 315 combines the feedback signal from feedback loop 418 with an input signal 444 before outputting the combination at the input 122 of resonator 120. Since noise-added output signal 424 contains a signal component based on the injected noise signal 316, the feedback loop 418 serves to inject or drive at least a portion of noise signal from noise generator 316 into the input 122 of the resonator. Due to the linearity of the resonator transfer function, at output 124 of the resonator, the output signal is a combination of response to input signal 444 as well as response to the noise signal from noise generator 316. Therefore the output 124 and similarly output signal 424 contains a noise response component from the resonator 120. In some embodiments, input signal 444 may represent a sensed characteristic such as acceleration of rotational speed of a MEMS sensor device of which the resonator 120 is a part.

The digitized output $D_{out}$ 424 is cross-correlated with the noise signal from noise generator 316 at cross-correlator 412. In some embodiments where the noise signal from noise generator 316 is injected after the resonator output 124, the cross correlation result represents a noise transfer function (NTF). In other embodiments where the noise signal from noise generator 316 is injected at the resonator input 122, the cross correlation result represents a signal transfer function (STF). Whether the transfer function is a NTF or STF may depend on the location within the circuit at which the noise signal is introduced. For example, a NTF may be the transfer function from an input of a quantizer to an output of a sigma delta loop. A STF may be a transfer function from an electrical signal transduced to force and added directly to the input of the mechanical resonator. In the embodiment shown in FIG. 4, the cross correlation is performed in the digital domain and the output impulse response 413 represents a NTF of resonator 120 in the digital domain.

Figure 5A:
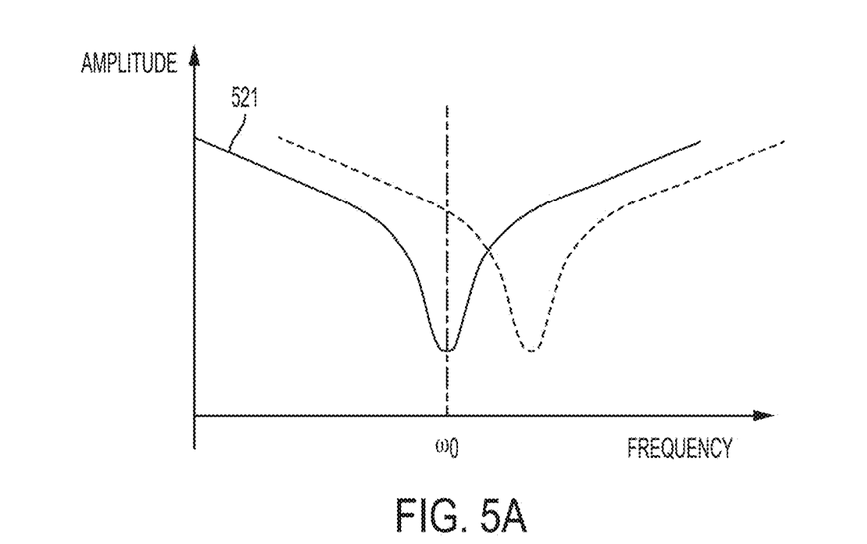
FIGS. 5A and 5B illustrate a schematic data plot showing the amplitude and phase components, respectively, of an exemplary modulated transfer function when noise is applied at the quantizer input as shown in FIG. 4, according to a non-limiting embodiment.

FIG. 5A shows an exemplary transfer function amplitude versus frequency curve 521 for the transfer function of resonator 120 as measured at output 413, according to some embodiments. In FIG. 5A, the amplitude of curve 521 varies depending on the value of frequency. The transfer function may take the form of:

$$NTF = \frac{1}{1+H(s)\beta} \cong \frac{s^2 + \frac{\omega_0}{Q}s + \omega_0^2}{s^2 + \frac{\omega_0}{\frac{1}{\beta}}s + \omega_0^2} \quad \text{Eq. (2)}$$

where s is frequency, H(s) is the transfer function of the resonator, β is the feedback gain of the feedback path in which the resonator is positioned and $\omega_0$ is the resonance frequency of the resonator. As shown in FIG. 5A, the transfer function amplitude curve shows a minimum at resonance frequency $\omega_0$.

Figure 5B:
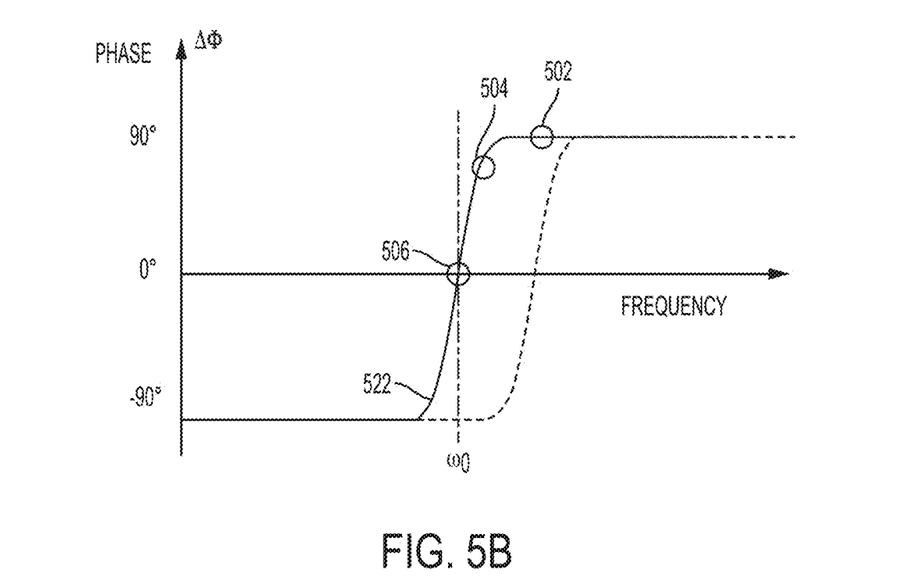

FIG. 5B shows an exemplary transfer function phase versus frequency curve 522 for the transfer function of resonator 120 at output 413, according to some embodiments. The phase Δϕ of the transfer function varies depending on frequency. For example, at point 502, when the frequency is larger than resonance frequency $\omega_0$ of the resonator 120, the phase $\Delta\phi$ is substantially at +90°. At point 504, when the frequency is close to but still slightly larger than $\omega_0$, the phase $\Delta\phi$ is a positive value between zero and 90°. At point 506, at resonance frequency $\omega_0$, the phase $\Delta\phi$ is zero. Therefore the value of the phase $\Delta\phi$ of the transfer function can be used to determine the difference between a chosen frequency $\omega_2$ and the resonance frequency $\omega_0$ of resonator 120. Specifically, according to some embodiments, $$\Delta\phi = \frac{90°}{\frac{\omega_0}{Q}}(\omega_0 - \omega_2). \qquad \text{Eq. (3)}$$

Therefore measuring the phase of the transfer function at a reference frequency will provide an indication of the difference between the reference frequency and the resonance frequency of the resonator 120. In some embodiments, a reference frequency signal may be generated based on a resonance frequency of a second resonator such that the transfer function phase measurement may be used in a feedback loop to mode-match resonance frequencies of the two resonators until the phase of the transfer function becomes zero.

Further in the example illustrated in FIG. 4, cross-correlating the noise signal with the digitized output $D_{out}$ 424 provides an impulse response of the transfer function. To measure the phase, the impulse response, or a signal derived from the impulse response through additional processing (e.g., amplification, or other processing functions represented by the dashed arrow in FIG. 4), is used in filter 414 to filter a digitized reference signal 441 with a reference frequency $\omega_2$. The filter 414 may therefore be a digital filter. The filtered transfer function output 415 is mixed with reference signal 441 at a mixer 416 to produce a mixed, or demodulated transfer function output at 417. The mixer output 417 is a signal proportional to the phase $\Delta\phi$ in the example in FIG. 5B and as modeled by Eq. (3) around $\omega_0$. The mixer output 417 may be further filtered using a low-pass filter 432 to remove spurious signals and high frequency artifacts, before being coupled to a digital-analog converter (DAC) 434 to convert to an analog control signal 321 to adjust the resonance frequency of resonator 120 via a second feedback loop. In some embodiments, the resonance frequency of resonator 120 is iteratively adjusted in the feedback loop until the value of the phase $\Delta\phi$ as measured at the demodulated mixer output 417 is substantially zero, indicating that the resonance frequency of resonator 120 is mode-matched with the reference frequency of signal 441, or until the phase assumes some other target value. In some embodiments, digitized signal 441 is a generated signal with a single frequency based on the primary resonator's resonance frequency in a MEMS gyroscopic sensor while resonator 120 is a secondary resonator/accelerator to be mode-matched to the resonance frequency of the primary resonator.

According to aspects of the present application, converting the output signal of the noise-added resonator output into the digital domain is done such that subsequent processing of the digitized transfer function, including the modulation and demodulation of the digitalized transfer function, may be performed, at least in part, using simple addition and subtraction, without significant use of multiplication. Such operation reduces complexity and the computing power to perform the calculations.

Figure 6:
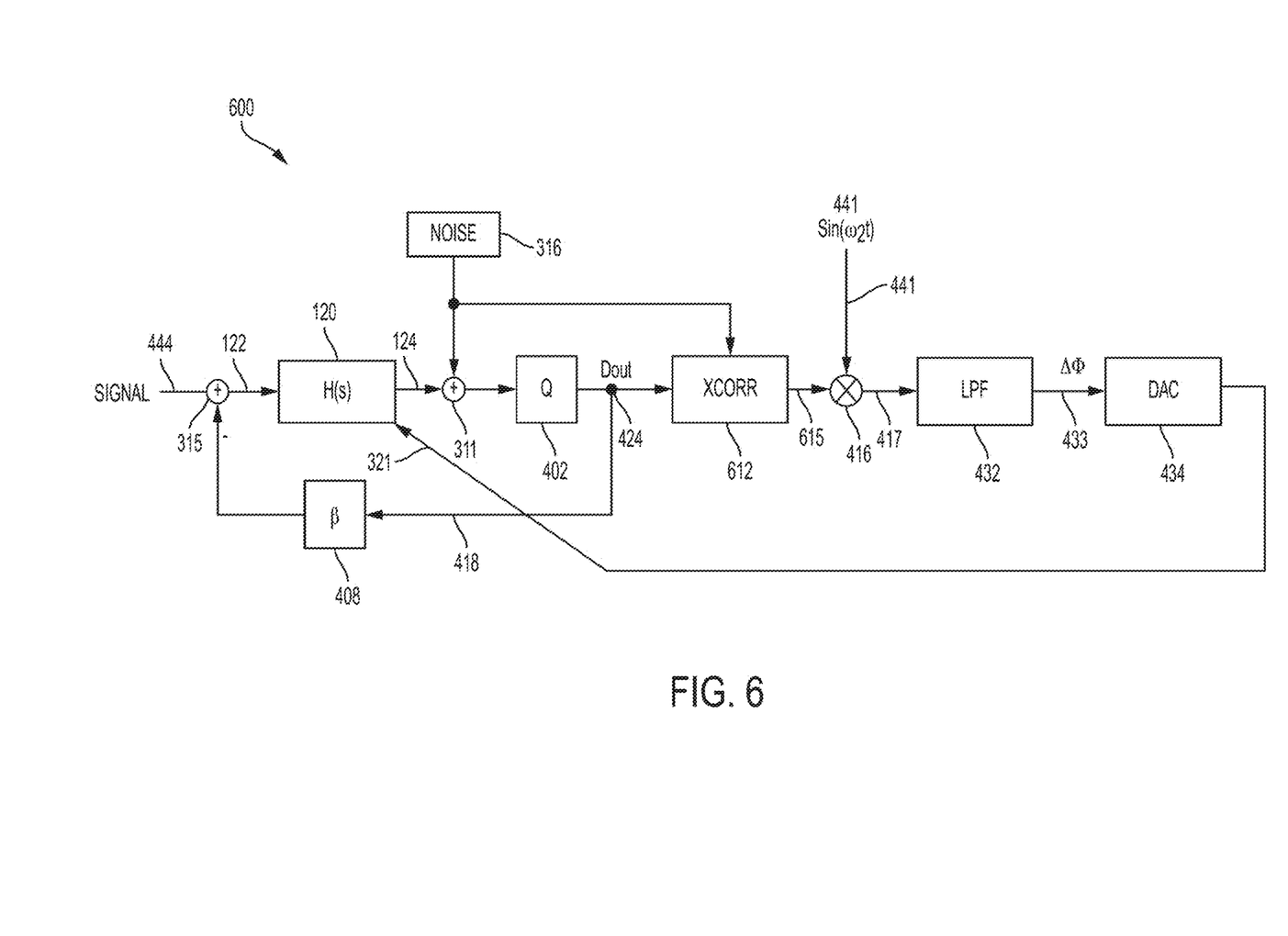
FIG. 6 is a block diagram showing exemplary components of an apparatus for mode-matching resonator frequencies, according to a non-limiting embodiment.

FIG. 6 shows another apparatus 600 for mode-matching resonator frequencies or for providing a desired split mode operation, according to some aspects of the present application. Apparatus 600 is similar in some respects to apparatus 400 as discussed above. In the example in FIG. 6, resonator output 124 has added to it a noise signal from noise generator 316 at adder 311 and the noise-added output is digitized at quantizer 402 into digitized output 424. A first feedback loop 418 feeds at least a portion of the digitized output 424 into adder 315 to be combined with input signal 444, which is then provided to input 122 of the resonator 120. The cross-correlation result 615 of the noise signal and the digitized output 424 represents an impulse response sequence. Therefore, this embodiment differs from the embodiment of FIG. 4 in that there is no separate modulation of the NTF of resonator 120. A mixer 416 may then be used to demodulate the cross-correlation result 615 with the reference signal 441 to produce a demodulated mixer output 417 proportional to the phase $\Delta\phi$ in the example in FIG. 5B. Phase $\Delta\phi$ is proportional to the difference between frequency of the reference frequency signal 441 and the resonance frequency of resonator 120. The demodulated mixer output 417 may be further filtered using a low-pass filter 432. Such filtering may remove spurious signals and high frequency artifacts. The output 433 includes both magnitude, as shown in FIG. 5A, and a phase value $\Delta\phi$ as shown in FIG. 5B. This information is used to control a digital-analog converter (DAC) 434 to convert to an analog control signal 321 to adjust the resonance frequency of resonator 120 via a second feedback loop.

Figure 7:
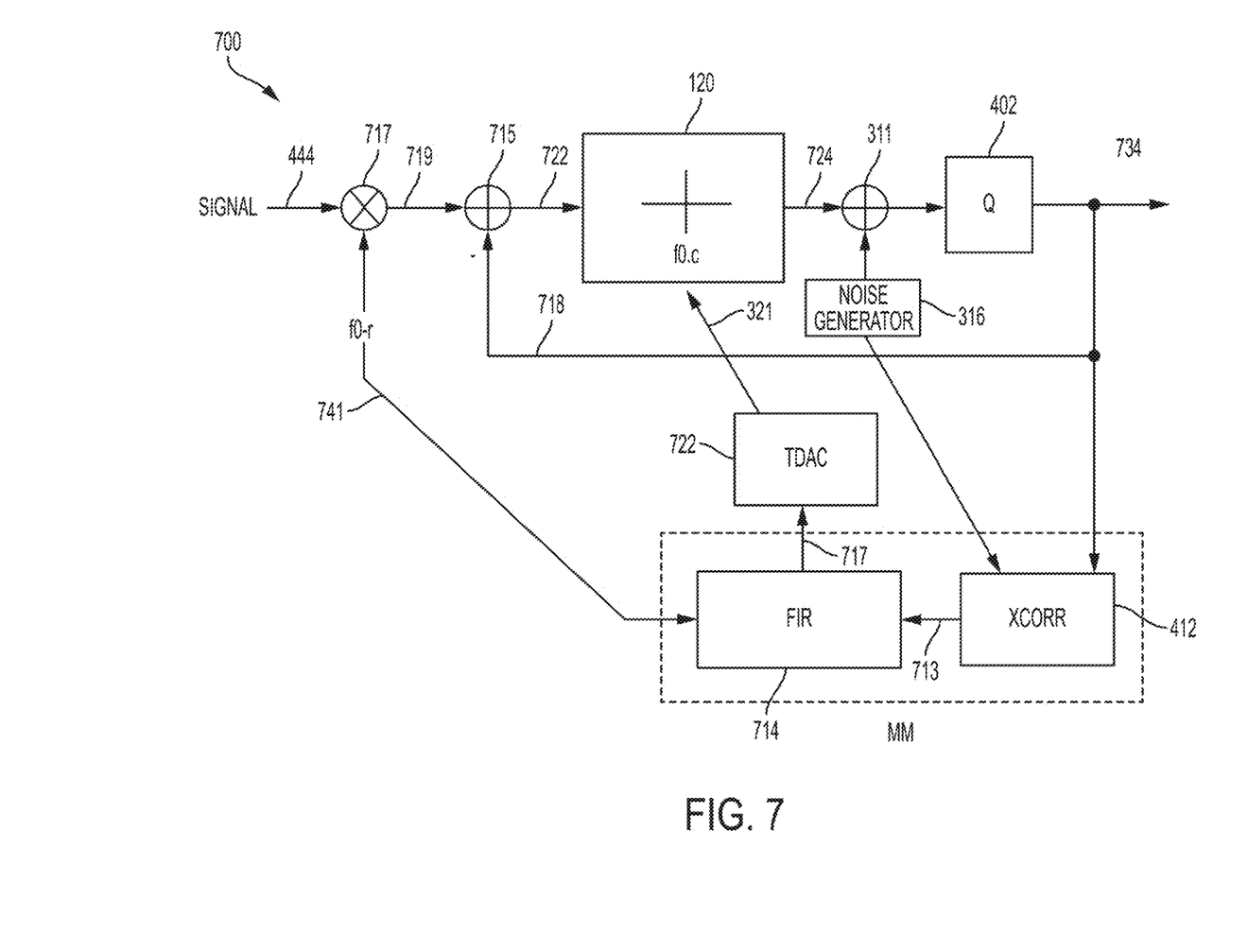
FIG. 7 is a block diagram showing exemplary components of an apparatus for mode-matching resonator frequencies, according to a non-limiting embodiment.

FIG. 7 shows yet another exemplary apparatus 700 for mode-matching resonator frequencies or providing a desired split mode operation, and shares many of the same components described previously in connection with apparatus 400 as discussed above. In apparatus 700, an input signal 444 representing a rotation signal generates a Coriolis signal 719. The Coriolis signal 719 is combined at an adder 715 with at least a portion of the output signal 734 via a first feedback loop 718 and provided as an input 722 to resonator 120. The resonator output 724 has added to it noise from noise generator 316 at adder 311 and the noise-added output is subsequently digitized at digitizer 402 to produce digitized output 734. Although not shown, any suitable digital to analog conversion may be employed in the first feedback loop 718 to convert the digitized output 734 into analog form before adding it at adder 715. Digitized output 734 is cross-correlated with noise signal 316 at cross-correlator 412 to produce an impulse response of a transfer function as modeled by Eq. (2) at cross-correlator output 713. The impulse response is used to make a digital filter, which could be a finite impulse response (FIR) filter as modeled at 714.

Apparatus 700 further comprises a finite impulse response (FIR) filter 714 coupled to receive the signal with reference frequency 741 and the cross-correlated impulse response 713. The FIR filter 714 produces a filtered signal 717 representing a difference between the resonance frequency of the resonator 120 and the reference frequency. filtered signal 717 is converted into analog domain at a digital-to-analog converter 722 and used in a feedback loop to control the resonance frequency of resonator 120 at control input 321 such that the resonance frequency of the resonator 120 is mode-matched with the reference frequency of signal 741 or set to a desired offset from the reference frequency. In some embodiments, signal 741 is a generated signal with a single frequency based on the primary resonator's resonance frequency in a MEMS gyroscopic sensor while resonator 120 is a secondary resonator/accelerator to be mode-matched to the resonance frequency of the primary resonator.

The technology described herein may be used in various settings, including those in which MEMS inertial sensors are used. For example, automotive, industrial, and healthcare applications may all make use of the technology described herein.

Figure 8:
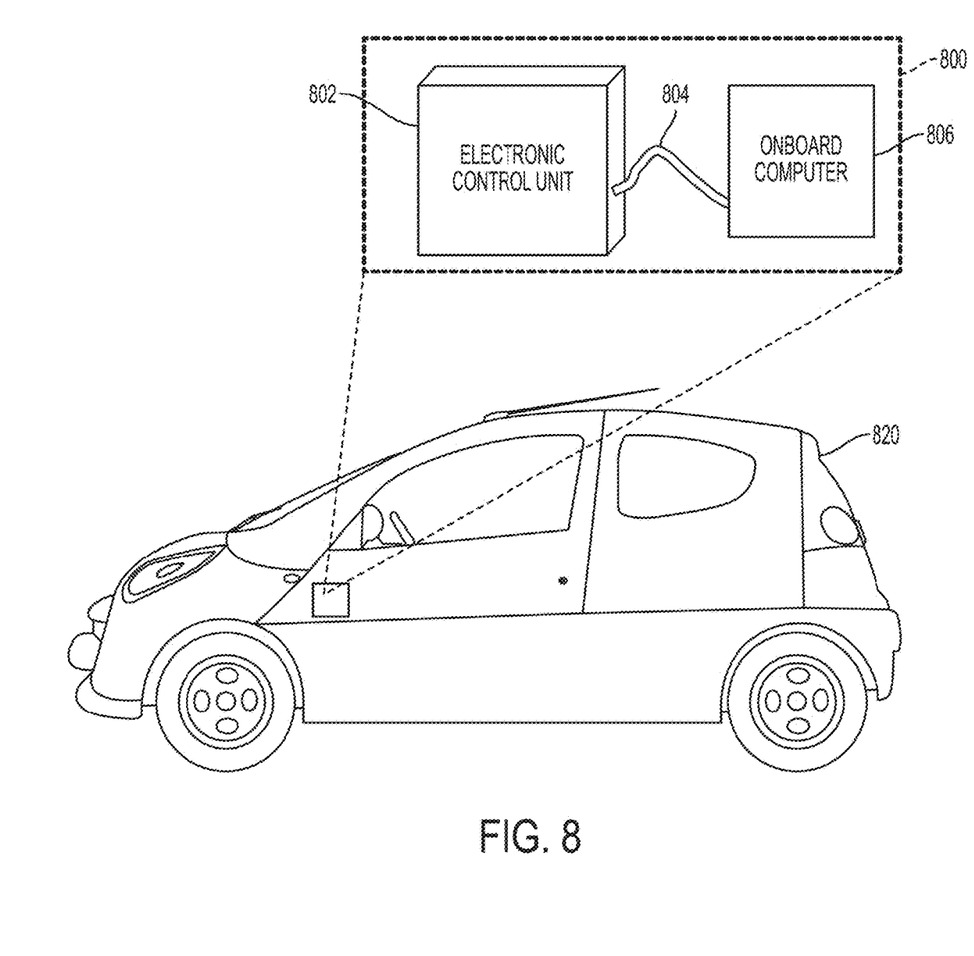
FIG. 8 is a schematic diagram showing an exemplary application of an apparatus for mode-matching resonator frequencies of the types described herein.

FIG. 8 is a schematic diagram showing an exemplary application of an apparatus in an automotive setting, according to some embodiments. A system 800 may be used in a vehicle 820. The system 800 comprises an electronic control unit 802 and on board computer 806 coupled to the electronic control unit 802 via interconnection 804. Electronic control unit 802 may comprise one or more MEMS sensor devices that provide sensing of translational and/or rotational accelerations along a multitude of axes. Various embodiments of the present application may be implemented in an electronic control unit 802 to provide mode-matching between resonators such as the primary resonator and secondary resonator/accelerator of MEMS gyroscopic sensors and to increase the signal noise ratio of the sensed characteristic.

While FIG. 8 illustrates an example of an automotive device incorporating aspects of the present application, other uses are possible. For example, one or more MEMS sensor devices may be employed in a consumer wearable device to track a user's motion for fitness, diagnostics or health monitoring purposes. Various embodiments of the present application may be implemented to provide mode-matching between resonators in MEMS sensors for wearable devices to increase sensed signal amplitude and reduce power consumption related to post-processing of signals with low signal to noise ratio.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A method for operating a device having a first mechanical resonator with a first resonance frequency and a second mechanical resonator with a second resonance frequency, the method comprising:
   generating an impulse response of a transfer function of the first mechanical resonator by driving a noise signal to the first mechanical resonator and cross-correlating the noise signal with a signal representing or derived from an output signal of the first mechanical resonator; and
   determining a difference between the first resonance frequency of the first mechanical resonator and the second resonance frequency of the second mechanical resonator using the impulse response of the transfer function of the first mechanical resonator.

2. The method of claim 1, further comprising mode matching the first mechanical resonator and the second mechanical resonator by adjusting the first resonance frequency and/or second resonance frequency based on the difference between the first resonance frequency of the first mechanical resonator and the second resonance frequency of the second mechanical resonator.

3. The method of claim 1, wherein determining the difference between the first resonance frequency and the second resonance frequency comprises determining the difference based at least in part on a phase of the impulse response at the second resonance frequency.

4. The method of claim 1, wherein determining the difference between the first resonance frequency and the second resonance frequency comprises determining the difference based at least in part on a magnitude of the impulse response at the second resonance frequency.

5. The method of claim 1, wherein determining the difference between the first resonance frequency and the second resonance frequency comprises filtering a signal representing the second resonance frequency with the impulse response or a signal derived from the impulse response.

6. The method of claim 1, wherein driving the noise signal to the first mechanical resonator comprises injecting the noise signal into a feedback loop including the first mechanical resonator.

7. The method of claim 6, further comprising digitizing an output signal of the feedback loop, wherein the cross-correlating is performed in a digital domain.

8. The method of claim 1, further comprising receiving and processing the signal representing or derived from an output signal of the first mechanical resonator to characterize a sensed characteristic of the first mechanical resonator, wherein the receiving and processing are performed while driving the noise signal to the first mechanical resonator.

9. A microelectromechanical systems (MEMS) apparatus, comprising:
   a first mechanical resonator with a first resonance frequency;
   a second mechanical resonator with a second resonance frequency;
   a noise source configured to drive a noise signal to the first mechanical resonator;
   a cross-correlator configured to generate an impulse response of a transfer function of the first mechanical resonator by cross-correlating the noise signal with a signal representing or derived from an output signal of the first mechanical resonator; and
   processing circuitry configured to determine a difference between the first resonance frequency of the first mechanical resonator and the second resonance frequency of the second mechanical resonator using the impulse response of the transfer function of the first mechanical resonator.

10. The MEMS apparatus of claim 9, further comprising control circuitry coupled to the first mechanical resonator and/or the second mechanical resonator and configured to mode match the first mechanical resonator and the second mechanical resonator by adjusting the first resonance frequency and/or second resonance frequency based on the difference between the first resonance frequency of the first mechanical resonator and the second resonance frequency of the second mechanical resonator.

11. The MEMS apparatus of claim 9, wherein the processing circuitry is configured to determine the difference based at least in part on a phase of the impulse response at the second resonance frequency.

12. The MEMS apparatus of claim 9, wherein the processing circuitry is configured to determine the difference based at least in part on a magnitude of the impulse response at the second resonance frequency.

13. The MEMS apparatus of claim 9, wherein the processing circuitry comprises a filter configured to filter a signal representing the second resonance frequency with the impulse response or a signal derived from the impulse response.

14. The MEMS apparatus of claim 9, wherein the first mechanical resonator forms part of a feedback loop, and wherein the noise source is configured to supply the noise signal to the feedback loop.

15. The MEMS apparatus of claim 9, further comprising a quantizer coupled between the first mechanical resonator and the cross-correlator.

16. The MEMS apparatus of claim 9, wherein the noise source configured to drive the noise signal to the first mechanical resonator in a background mode of operation.

17. The apparatus of claim 9, wherein the first mechanical resonator is configured as an accelerometer, the second mechanical resonator is configured as a primary resonator and the MEMS apparatus is a MEMS gyroscopic sensor.

18. A microelectromechanical systems (MEMS) apparatus, comprising:
  a first mechanical resonator with a first resonance frequency;
  a second mechanical resonator with a second resonance frequency; and
  means for determining a difference between the first resonance frequency and the second resonance frequency.

19. The MEMS apparatus of claim 18, wherein the means for determining a difference between the first resonance frequency and the second resonance frequency comprises means for generating an impulse response of a transfer function of the first mechanical resonator.

20. The MEMS apparatus of claim 19, wherein the means for determining a difference between the first resonance frequency and the second resonance frequency comprises means for determining the difference between the first resonance frequency and the second resonance frequency based at least in part on a phase of the impulse response at the second resonance frequency.

* * * * *